(12) United States Patent
Lamb et al.

(10) Patent No.: US 9,133,952 B2
(45) Date of Patent: Sep. 15, 2015

(54) THERMOSTATIC BYPASS VALVE WITH A UNIQUE VALVE SEAT

(75) Inventors: Kevin Lamb, West Hartford, CT (US); Kenneth Lionello, Waterbury, CT (US); Tim Haskell, Kent, CT (US)

(73) Assignee: Rostra Vernatherm LLC, Bristol, CT (US)

( * ) Notice: Subject to any disclaimer, the term of this patent is extended or adjusted under 35 U.S.C. 154(b) by 1125 days.

(21) Appl. No.: 13/078,161

(22) Filed: Apr. 1, 2011

(65) Prior Publication Data

US 2012/0247582 A1  Oct. 4, 2012

(51) Int. Cl.
*F01P 7/16* (2006.01)
*F16K 31/00* (2006.01)
*F16K 11/044* (2006.01)
*G05D 23/02* (2006.01)
*F01M 5/00* (2006.01)

(52) U.S. Cl.
CPC ............. *F16K 31/002* (2013.01); *F16K 11/044* (2013.01); *G05D 23/022* (2013.01); *F01M 5/007* (2013.01); *F01P 7/16* (2013.01); *F01P 2060/04* (2013.01); *F01P 2060/045* (2013.01); *Y10T 137/7737* (2015.04)

(58) Field of Classification Search
CPC ... F01P 7/16; F01P 2060/045; F01P 2060/04; G05D 23/022; F01M 5/007; F16K 31/002

USPC .......................................... 236/34, 34.5, 99 K
See application file for complete search history.

(56) References Cited

U.S. PATENT DOCUMENTS

| | | | |
|---|---|---|---|
| 3,949,777 A | 4/1976 | Caldwell | |
| 4,190,198 A | 2/1980 | Casuga et al. | |
| 5,129,577 A * | 7/1992 | Kuze | 236/34.5 |
| 5,791,557 A * | 8/1998 | Kunze | 236/34.5 |
| 5,961,037 A * | 10/1999 | Fiedler et al. | 236/34.5 |
| 6,253,837 B1 | 7/2001 | Seiler et al. | |
| 6,499,666 B1 | 12/2002 | Brown | |
| 6,719,208 B2 | 4/2004 | Brown | |
| 6,935,569 B2 | 8/2005 | Brown et al. | |
| 7,299,994 B2 * | 11/2007 | Brown et al. | 236/34.5 |
| 2008/0223316 A1 * | 9/2008 | Banta et al. | 123/41.1 |
| 2009/0140055 A1 * | 6/2009 | Iwasaki | 236/34.5 |
| 2010/0151981 A1 | 6/2010 | Hartinger et al. | |

* cited by examiner

*Primary Examiner* — Marc Norman
*Assistant Examiner* — Max Snow
(74) *Attorney, Agent, or Firm* — Alix, Yale & Ristas, LLP (57) ABSTRACT

A fluid control thermostatic valve contains thermally responsive wax. As temperature rises, the wax expands thus pushing a deformable member up a confined path defined by guide 40 until the member contacts a fixed post 60. An immobile retainer 72 is secured to the fixed post 60. Force from the elastic member against the post causes actuator 30 to separate from retainer 72, thus opening a flow passage. The control valve is unique because retainer 72 functions as both a valve seat for actuator 30 and a fixed support for spring 84.

8 Claims, 7 Drawing Sheets

THERMOSTATIC BYPASS VALVE WITH A UNIQUE VALVE SEAT

TECHNICAL FIELD

The present disclosure relates to a temperature sensitive fluid flow control valve which also functions as a pressure relief valve. One use for the disclosed valve is to control the opening and closing of a bypass passage in a fluid cooling system to provide warm up and steady state (cooling) flow paths for the fluid. The integrated pressure relief functionality prevents excess pressure accumulation.

BACKGROUND

Fluid cooler bypass valves are used in conjunction with engines, transmissions, power steering systems, hydraulic systems and other systems that heat a working or lubricating fluid. They are designed to provide a flow path by which fluid delivered to the valve from the heat source is returned without passing through a fluid cooler such as a radiator or other heat exchanger during warm-up periods.

Typical fluid cooler bypass valves include an actuator which responds to temperatures above a set-point to move a valve member from a bypass position where fluid is permitted to flow from the source of heated fluid to the fluid cooler return path without passing through the fluid cooler. Prior art bypass valves move from a bypass position where a bypass passage is open and the flow path to or from a cooler is obstructed to a steady state (cooling) position where the bypass passage is closed and the flow path to and from the fluid cooler is open. The fluid flow path can be re-configured using a single valve member.

The use of wax-filled actuators, otherwise referred to as wax motors, as thermally responsive control devices in fluid circulation systems is well known. Wax motors have been used as temperature sensitive actuators for valves employed in fluid cooling systems to control flow paths for fluid during warm-up and steady state operating conditions. Such bypass valves are designed to open or close in response to a predetermined change in temperature. Wax motors require no external power source, are reliable, extremely compact and powerful for their size.

Wax motors typically include a housing having a chamber filled with thermally responsive wax contained beneath a flexible diaphragm. The wax expands as temperature increases, exerting an outward force on the diaphragm and on a reciprocating piston disposed on the other side of the diaphragm. Movement of the piston is controlled by a guide extending from the actuator housing. The wax motor is constructed such that known changes in temperature produce predetermined axial movement of the piston with respect to the housing.

Consequently, there exists a need for a thermally actuated flow control valve with pressure relief capability that employs a simplified mechanism to provide warm-up and steady state flow paths in a fluid cooling system.

SUMMARY

The disclosure relates to a thermally actuated fluid flow control valve of simple construction and enhanced functionality. The temperature sensitive fluid flow control valve is configured to be placed within a bypass passage defined by a valve body. The bypass passage is in communication with fluid supply and fluid return passages associated with a source of heated fluid and a fluid cooler, the bypass passage connects a flow path from the source of heated fluid with a flow path from the fluid cooler. The bypass passage also includes a valve seat.

The disclosed fluid flow control valve includes an actuator having an actuator body, a guide extending in a first axial direction from the actuator body to a first end of the actuator and an oppositely directed plunger extending from the actuator body to a second end of the actuator. The guide defines an axial bore open at the first end of the actuator and includes a first flange projecting radially outwardly from the first end of the actuator. The actuator body includes a metering surface extending radially outward of the guide and substantially perpendicular to the axial length of the actuator.

The disclosed fluid flow control valve is an assembly configured for installation through a valve body opening communicating with the bypass passage. A cap is configured to cover the opening in the valve body and support the fluid flow control valve within the bypass passage. The cap includes an axially disposed post which is received in the axial bore of the guide to control movement of the actuator. A retainer is secured to the cap to form a flange facing the closed end of the cap and an opposed valve seat facing the bypass passage. The ring-shaped retainer defines a central flow aperture through which the actuator guide is received with the post extending into the guide axial bore.

The disclosed fluid flow control valve includes a valve member movably secured to the plunger and surrounding a second end of the actuator. The valve member is axially movable with respect to the plunger and biased toward an extended position projecting away from the actuator body toward a valve seat in the bypass passage defined by the valve body.

A bias member is engaged between a flange on the guide and the retainer to bias the actuator toward a bypass position where the actuator blocks the flow aperture defined by the retainer to close a fluid return path from the fluid cooler. The valve member secured to the actuator plunger is separated from the valve seat in the bypass passage when the fluid flow control valve is in the bypass position, thereby permitting fluid flow through the bypass passage between the source of heated fluid and a return flow path from said fluid cooler without flowing through the fluid cooler.

The components of the actuator are selected so that the actuator exerts a force F on the post at temperatures above a predetermined temperature T. The actuator force F is sufficient to overcome the bias of the bias member engaged with the actuator guide and move the actuator away from the cap to a steady state position. In the steady state position, the actuator is moved away from the valve seat defined by the retainer to open a fluid flow path between the cooler outlet and the heat source inlet. The same movement of the actuator moves the valve member secured to the plunger into contact with the valve seat defined by the valve body to close the bypass passage. In the disclosed fluid flow control valve embodiment, the actuator body provides a first valve, while the second end of the actuator carries a valve member with spring biased axial movement relative to the actuator. Movement of the actuator between the bypass and steady state positions first opens the flow path between the fluid cooler and the heat source and then closes the bypass passage. The cooler flow path and bypass passage cannot be open at the same time in the absence of excess pressure on the valve member.

DETAILED DESCRIPTION

Figure 1:
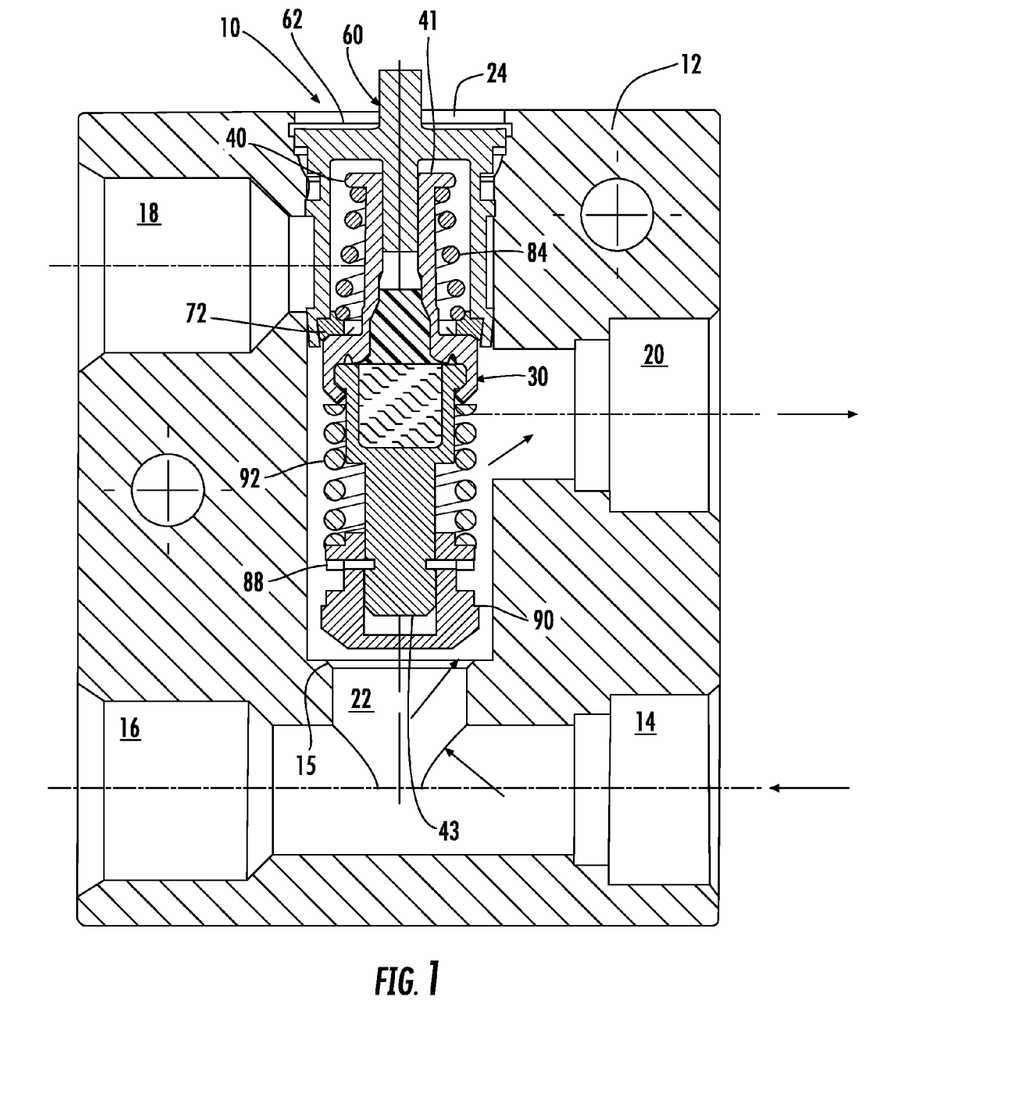
FIG. 1 is a sectional view through an embodiment of the disclosed fluid flow control valve installed in a valve body and shown in the bypass position.
Figure 2:
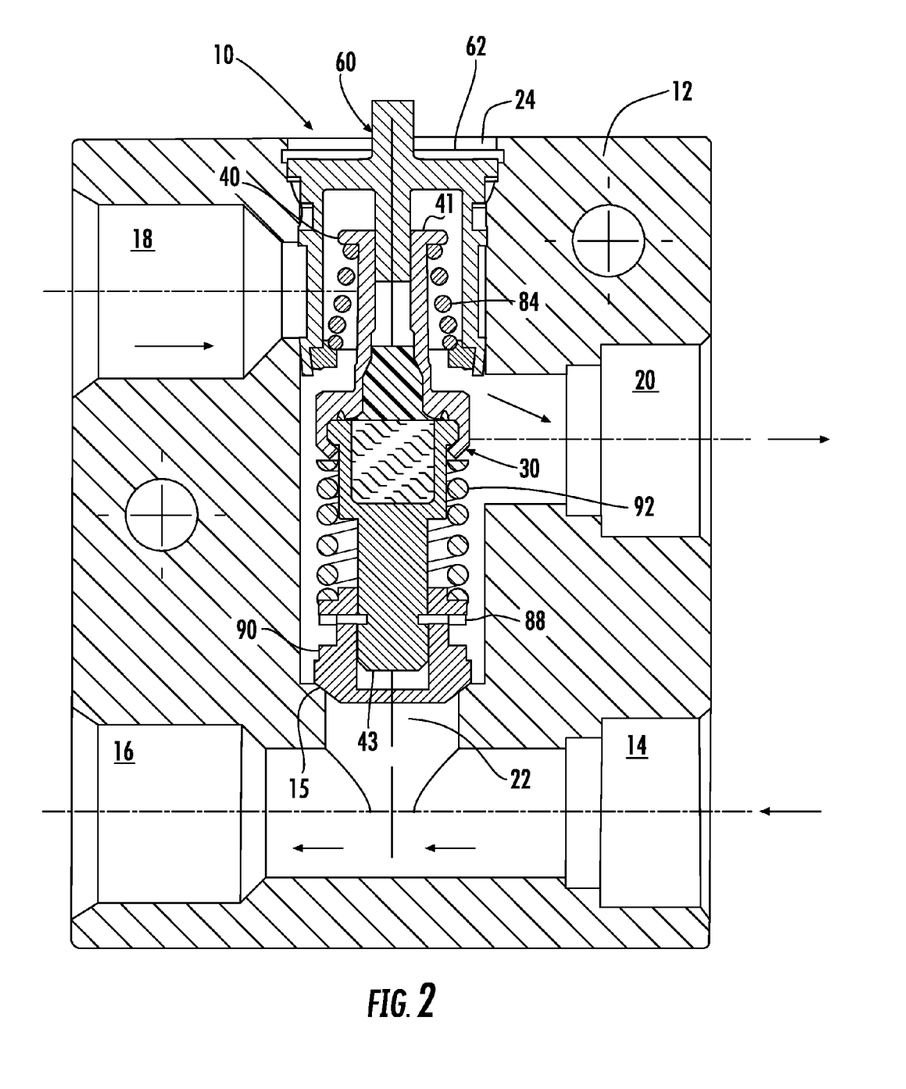
FIG. 2 shows the fluid flow control valve and valve body of FIG. 1 in the steady state (cooling) position.

The disclosed fluid flow control valve 10 is configured for installation in a valve body 12 arranged between a source of heated fluid (not shown) and a fluid cooler such as a radiator or heat exchanger (not shown). Sources of heated fluid include internal combustion engines, vehicle transmissions, hydraulic pumps, or the like. A valve body 12 defines fluid flow passages for receiving heated fluid from a heat source, delivering the heated fluid to the fluid cooler and returning cooled fluid to the heat source. As shown in FIGS. 1 and 2, there are four fluid flow openings 14, 16, 18, 20 in the valve body 12. Opening 14 receives fluid from the heat source. Opening 16 communicates with the fluid cooler input. Opening 18 receives cooled fluid from the fluid cooler. Opening 20 returns cooled fluid back to the heat source. The valve body 12 defines a bypass passage 22 in fluid communication with each of openings 14, 16, 18 and 20. The bypass passage 22 includes a valve seat 15 and an opening 24 through the side of the valve body 12, permitting installation of the disclosed fluid flow control valve 10.

Figure 5:
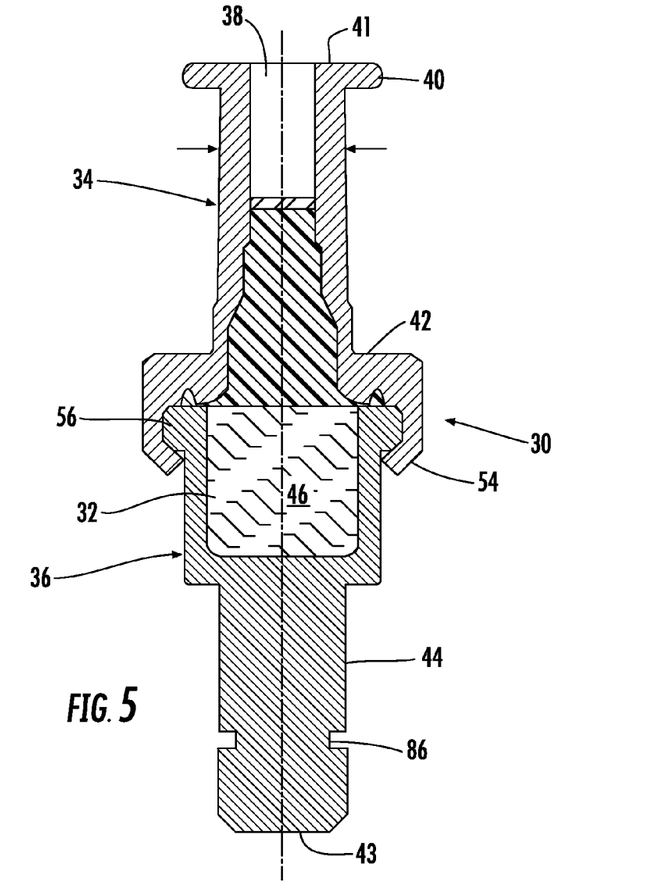
FIG. 5 is a sectional view of an embodiment of an actuator compatible with the disclosed fluid flow control valve.
Figure 6:
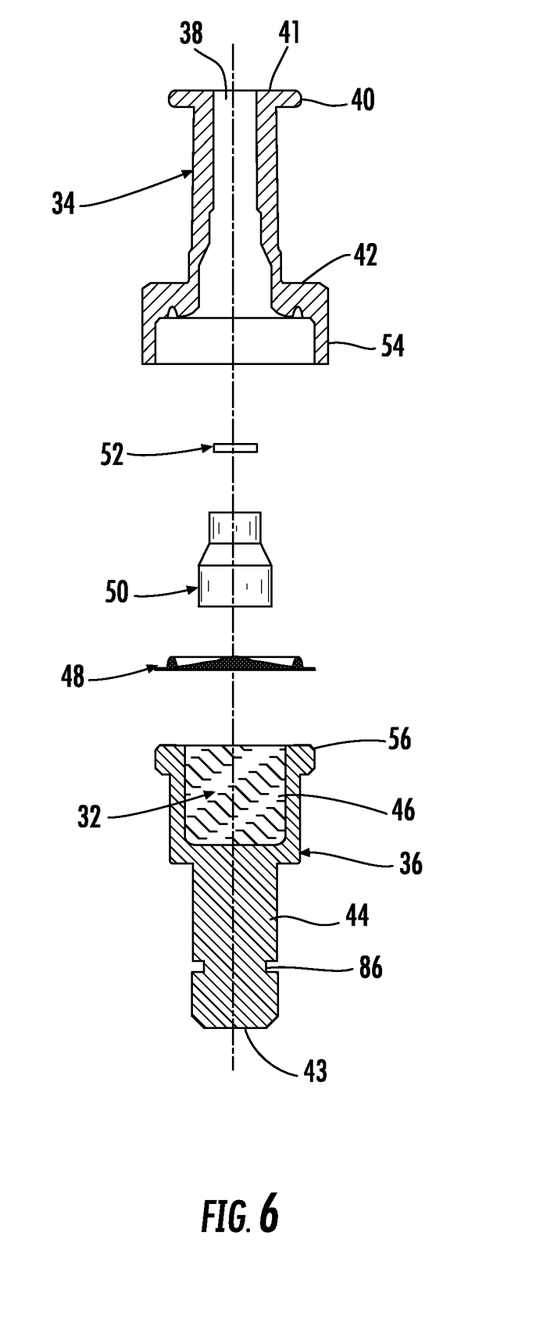
FIG. 6 is an exploded sectional view of the actuator of FIGS. 5.
Figure 7:
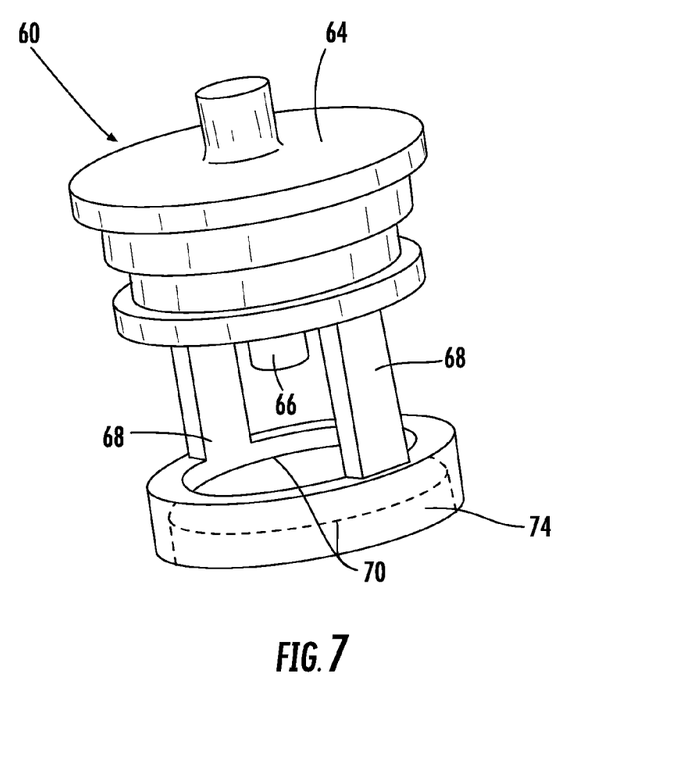
FIG. 7 is a perspective view of a cap component compatible with the disclosed embodiment of a fluid flow control valve.

The disclosed fluid flow control valve 10 includes an actuator 30 which defines an internal cavity 32 containing thermally responsive wax material 46. As best seen in FIGS. 5 and 6, the illustrated actuator 30 includes two primary structural components—a guide 34 and a cup 36. In the illustrated embodiment, the guide 34 and cup 36 are constructed of half-hard 360 brass. The guide 34 defines an axial bore 38 and includes a radially projecting flange 40 at a first end 41 of the actuator 30. The guide 34 also includes a radially projecting metering surface 42 axially spaced from the flange 40. A plunger 44 extends integrally from the cup 36 in a direction opposite the guide 34. Thermally responsive wax material 46 fills the cavity 32 defined by the cup 36. A diaphragm 48 is arranged to contain the wax material 46 in the cavity 32. A plug 50 and disc 52 are forced up the bore 38 by expansion of the wax material 46 to deliver an axial force F from the actuator 30 in response to a temperature rise above a predetermined set point. FIG. 5 shows the components of the actuator in an assembled configuration. A lip 54 projecting from the guide 34 is mechanically formed around a radially projecting flange 56 at the end of the cup 36 to secure the guide 34 to the cup 36 as shown in FIG. 5. The illustrated construction permits the guide 34 to have an uninterrupted, radially projecting metering surface 42 which facilitates use of the actuator 30 as a valve member as discussed below.

Figure 3:
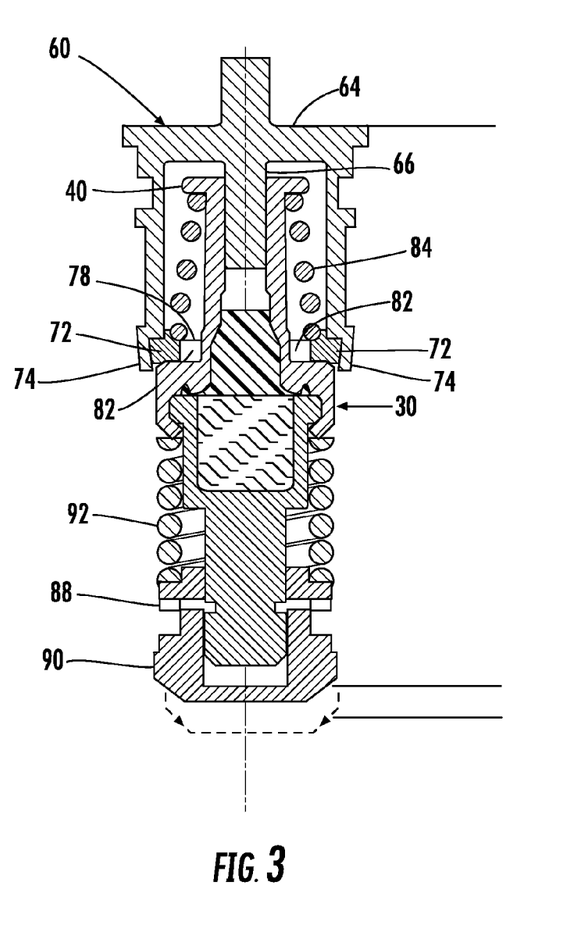
FIG. 3 is a sectional view through an embodiment of the disclosed fluid flow control valve.
Figure 4:
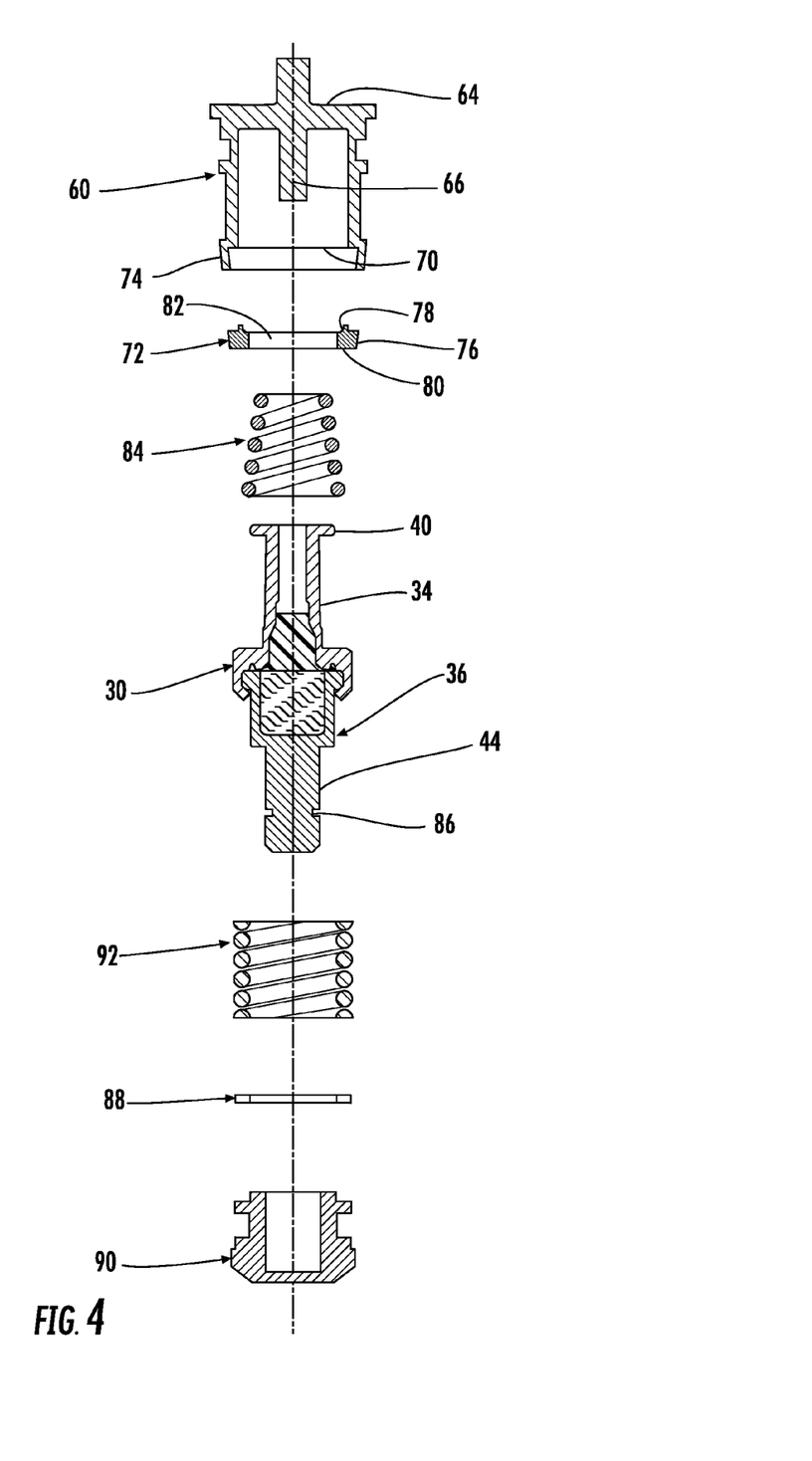
FIG. 4 is a sectional exploded view of the fluid flow control valve of FIG. 3.

FIGS. 3 and 4 illustrate an exemplary embodiment of the disclosed fluid flow control valve 10. The exemplary actuator 30 illustrated in FIGS. 5 and 6 ties the other components of the fluid flow control valve 10 together to form an assembly that is easily installed through valve body opening 24. A cap 60 is configured to close the valve body opening 24 and support the fluid flow control valve 10 in the bypass passage 22. The cap 60 is retained in the opening 24 by a snap ring 62 or other appropriate mechanical connection such as threads (not shown). The cap 60 includes a closed first end 64 and an inwardly directed axial post 66. Two arms 68 extend from the cap 60 to support an annular shoulder 70 radially outward of said post 66. A ring-shaped retainer 72 is secured against the shoulder 70 and in fixed relation to the cup. In the disclosed embodiment, the retainer 72 is secured to the cap 60 by mechanically forming a lip 74 of the cap 60 over an angled peripheral surface 76 of the retainer 72. This forms a mechanical connection between the retainer 72 and the cap 60. Other connection methods will occur to those skilled in the art. The retainer 72 provides a flange 78 facing the closed first end 64 of the cap 60 and provides a valve seat 80 on the opposite side. The retainer 60 also defines a central opening 82 which serves as a flow path for fluid when the fluid flow control valve 10 is in the steady state position shown in FIG. 2.

In the assembled fluid flow control valve 10 as shown in FIG. 3, the guide 34 passes through the central opening 82 of the retainer 72 and receives the post 66 extending from the cap 60 into the axial bore 38 of the guide 34. A bias member 84 is engaged between the flange 40 of the guide 34 and the flange 78 of the retainer 72 to bias the actuator 30 toward the bypass position illustrated in FIG. 1. Expansion of the thermal wax material 46 in response to an increase in temperature above a predetermined set point produces a force F through the plug 50 and disc 52 against the post 66 to overcome the bias of the bias member 84. The disclosed bias member 84 is a conical coil spring with end faces that are ground within 3° of normal to the spring axis. Other forms of bias member will occur to those skilled in the art.

The opposite end 43 of the actuator 30 includes a plunger 44 extending from the cup 36. The plunger 44 includes a circumferential groove 86 which receives a retaining clip 88. A valve member 90 is axially slidably movable relative to the plunger 44 and is retained to the plunger by the clip 88. The clip 88 and valve member 90 are configured so that the valve member 90 is permitted limited axial movement with respect to the plunger 44. A bias member 92 is arranged to bias the valve member 90 toward the extended position shown in FIGS. 1-3. Mounting the valve member 90 to the end of the actuator plunger 44 with biased axial movement serves two functions. First, temperatures in the valve body 12 may exceed the normal operating temperature for which the actuator 30 was designed. At such elevated temperatures, the wax 46 in the actuator 30 will continue to expand and continue to exert force on the post 66, moving the actuator 30 further away from the valve seat 80 illustrated in FIG. 2. The spring-biased valve member 90 accommodates excess movement of the actuator 30 and prevents possible damage to valve components that may otherwise occur. Second, the spring-biased slidably movable valve member 90 allows the disclosed fluid flow control valve 10 to relieve excess pressure on the "hot" side of the valve body 12 (openings 14, 16). Under certain circumstances, the fluid flowing through the valve body 12 may become overly pressurized. Such excess pressure can damage the fluid cooler (not shown). In the illustrated embodiment, excess fluid pressure in the fluid passageways 14 or 16 will overcome the spring bias on the valve member 90 and move it away from its valve seat 15, allowing fluid to flow back to the fluid source.

The disclosed fluid flow control valve 10 includes two alternatively operating valves. The first valve is formed by the actuator 30 closing the flow aperture 82 defined by the retainer 72. The valve interface is formed by the actuator radially projecting metering surface 42 and the valve seat 80 defined by the retainer 72. The second valve is formed by the valve member 90 mounted to the actuator plunger 44 and the valve seat 15 defined by the valve body 12. As shown in FIG. 1, when the fluid flow control valve 10 is in the bypass position, the metering surface 42 is seated against the retainer valve seat 80, closing the fluid flow aperture 82 defined by the retainer 72. This valve prevents fluid flow between the cool side (return 18) of the fluid cooler (not shown) and the fluid return 20 to the heat source. When the disclosed fluid flow control valve 10 is in the bypass position illustrated in FIG. 1, the valve member 90 is separated from the valve seat 15 defined by the valve body 12. Fluid flow through the fluid cooler (not shown) is obstructed, while fluid flow through the bypass passage 22 between the heat source outlet 14 and the fluid return 20 is permitted.

FIG. 2 illustrates the disclosed fluid flow control valve 10 in its steady state, or cooling position. When the heat source has warmed the fluid circulating in the valve body 12 to a predetermined set-point, the wax 46 contained in the actuator cup 36 expands, exerting force F on the post 66 and moving the actuator 30 away from its bypass position to the position shown in FIG. 2. In the steady state position, the valve member 90 is now in contact with the valve seat 15 defined by the valve body 12, closing the bypass passage 22. Meanwhile, the actuator 30 has moved away from its bypass position, separating the metering surface 42 from the valve seat 80 defined by the retainer 72 and opening a fluid flow path between the cool side 18 of the cooler and the cool fluid input 20 to the heat source (not shown).

The pressure relief functionality of the disclosed fluid flow control valve is adjustable by selecting the bias member 92. The illustrated bias member 92 is a coil spring, though other appropriate bias members are suitable. By selecting an appropriate bias member, the pressure at which the valve member 90 is moved away from the valve seat 15 can be adjusted. For example, the pressure relief set point may be selected at 20 psi less than the burst pressure of the fluid cooler or heat exchanger. Similarly, the actuator 30 can be configured to change position from bypass to steady state at a predetermined temperature by selection of actuator wax and bias member 84. For example, the actuator 30 may be selected so the fluid flow control valve 10 is fully opened at a temperature of approximately 230° and fully closed at a temperature of 220°. Those skilled in the art will understand that these pressure and temperature set points are merely exemplary and a range of temperature and pressure set points are available through appropriate component selection and design.

While a preferred embodiment of the disclosed fluid flow control valve has been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A temperature sensitive fluid flow control valve configured for installation between a fluid supply and a fluid cooler, the control valve comprising:
    a cap having a closed first end including an axially disposed post and a shoulder coaxial with said post and supported from said cap;
    an actuator including an actuator body, a guide extending from said actuator body to a first end of said actuator and an oppositely directed plunger extending from said actuator body to a second end of said actuator, said guide defining an axial bore open at said first end and including a first flange projecting radially outwardly from said first end, said actuator body radially outward of said guide forming a metering surface;
    a retainer secured to said shoulder to form (1) a second flange facing said cap closed first end and (2) a valve seat on an opposite side of said retainer, said retainer defining a central flow aperture through which said actuator guide is received with said post extending into said guide axial bore;
    a first bias member engaged between said first and second flanges to bias said actuator toward a first position where said metering surface is against said valve seat and said actuator body and guide close said central flow aperture;
    a valve member movably secured to said plunger and surrounding said second end of said actuator, said valve member axially movable with respect to said plunger and biased away from said actuator body toward an extended position;
    wherein said actuator exerts a force F on said post at temperatures above a predetermined temperature T, said force F sufficient to overcome the bias of said first bias member and move the metering surface of said actuator body away from said valve seat to open a flow path around said guide and through said flow aperture.

2. The temperature sensitive fluid flow control valve of claim 1, wherein said actuator body defines a cavity containing thermally responsive wax, said wax expands in response to an increase in temperature to generate said force F.

3. The temperature sensitive fluid flow control valve of claim 1, comprising a second bias member arranged between said actuator body and said valve member to bias said valve member toward said extended position.

4. The temperature sensitive fluid flow control valve of claim 1, wherein said actuator body comprises a cup integral with said plunger and said guide includes a circumferential lip projecting away from said actuator first end, said lip formed around a flange on said cup to retain said guide to said cup.

5. A temperature sensitive fluid flow control valve configured to be placed within a bypass passage in communication with fluid supply and fluid return passages associated with a source of heated fluid and a fluid cooler, the bypass passage connecting a flow path from the source of heated fluid with a flow path from the fluid cooler and including a first valve seat, said control valve comprising:
    an actuator including an actuator body, a guide extending from said actuator body to a first end of said actuator and an oppositely directed plunger extending from said actuator body to a second end of said actuator, said guide defining an axial bore open at said first end and including a first flange projecting radially outwardly from said first end, said actuator body including a metering surface radially outward of said guide and intermediate said actuator first and second ends;
    a cap having a closed first end including an axially disposed post, a shoulder coaxial with said post and supported from said cap, a retainer in fixed relation to said shoulder to form a second flange facing said cap closed first end and an opposed second valve seat, said retainer defining a central flow aperture through which said actuator guide is received with said post extending into said guide axial bore;
    a valve member movably secured to said plunger and surrounding said second end of said actuator, said valve member axially movable with respect to said plunger and biased toward an extended projecting away from said actuator body, said valve member configured to engage the first valve seat and close said bypass passage;

a first bias member engaged between said first and second flanges to bias said actuator toward a by-pass position where said metering surface engages said second valve seat and said actuator and guide close said central flow aperture to prevent fluid communication from the fluid cooler to the source of heated fluid, said valve member spaced apart from the first valve seat when said actuator is in the by-pass position thereby permitting fluid flow through the bypass passage between the source of heated fluid and a return flow path from said fluid cooler;

wherein said actuator exerts a force F on said post at temperatures above a predetermined temperature T, said force F sufficient to overcome the bias of said first bias member and move said actuator away from said cap to a steady state position where said metering surface is separated from said second valve seat to open a flow path around said guide and through said flow aperture and said valve member is moved into contact with said valve seat to close said bypass passage.

6. The temperature sensitive fluid flow control valve of claim 5, wherein said actuator body defines a cavity containing thermally responsive wax, said wax expands in response to an increase in temperature to generate said force F.

7. The temperature sensitive fluid flow control valve of claim 5, comprising a second bias member arranged between said actuator body and said valve member to bias said valve member toward said extended position.

8. The temperature sensitive fluid flow control valve of claim 5, wherein said actuator body comprises a cup integral with said plunger and said guide includes a circumferential lip projecting away from said actuator first end, said lip formed around a flange on said cup to retain said guide to said cup.

* * * * *

UNITED STATES PATENT AND TRADEMARK OFFICE
CERTIFICATE OF CORRECTION

PATENT NO.          : 9,133,952 B2                                          Page 1 of 2
APPLICATION NO.     : 13/078161
DATED               : September 15, 2015
INVENTOR(S)         : Kevin Lamb, Kenneth Lionello and Tim Haskell It is certified that error appears in the above-identified patent and that said Letters Patent is hereby corrected as shown below:

Column 5, line 62:
delete "an actuator body,"

Column 5, line 63:
delete "body"

Column 5, line 65:
delete "body"

Column 6, line 1:
delete "body"

Column 6, line 11:
delete "is against" and insert -- contacts --

Column 6, lines 11-12:
delete "and said actuator body and guide close" and insert -- closing --

Column 6, line 16:
delete "body"

Column 6, lines 21-22:
delete "of said actuator body"

Column 6, line 25:
delete "body"

Column 6, line 30:
delete "body"

Signed and Sealed this
Twenty-second Day of March, 2016

Michelle K. Lee
*Director of the United States Patent and Trademark Office*

CERTIFICATE OF CORRECTION (continued)
U.S. Pat. No. 9,133,952 B2

Column 6, line 33:
delete "body"

Column 6, line 45:
delete "an actuator body,"

Column 6, line 46:
delete "body"

Column 6, line 48:
delete "body"

Column 6, line 51:
delete "body including a metering surface"

Column 6, line 52:
after "said guide" insert -- forming a metering surface --

Column 6, lines 52-53:
delete "and intermediate said actuator first and second ends"

Column 6, line 66:
delete "body"

Column 8, line 4:
delete "body"

Column 8, line 9:
delete "body"

Column 8, line 12:
delete "body"